O. V. DUNN.
AUXILIARY SEAT.
APPLICATION FILED MAR. 14, 1916.

1,213,762. Patented Jan. 23, 1917.

Witnesses

Inventor
O. V. Dunn.
By Victor J. Evans
Attorney

UNITED STATES PATENT OFFICE.

OLIN V. DUNN, OF BROOKINGS, SOUTH DAKOTA.

AUXILIARY SEAT.

1,213,762. Specification of Letters Patent. Patented Jan. 23, 1917.

Application filed March 14, 1916. Serial No. 84,169.

*To all whom it may concern:*

Be it known that I, OLIN V. DUNN, a citizen of the United States, residing at Brookings, in the county of Brookings and State of South Dakota, have invented new and useful Improvements in Auxiliary Seats, of which the following is a specification.

In carrying out the present invention, it is my purpose to provide a portable auxiliary seat which will be found especially useful by those occupying the "bleachers" at baseball games, football games and other amusements and which will provide the occupant with a clean seat and a back rest.

It is also my purpose to provide a seat of the class described which will embrace the desired features of simplicity, efficiency and durability and wherein the back may be folded down onto the seat portion so that the device may be readily carried from place to place and stored in a small space.

With the above and other objects in view, the invention consists in the construction, combination and arrangement of parts hereinafter set forth in and falling within the scope of the claim.

Figure 1:
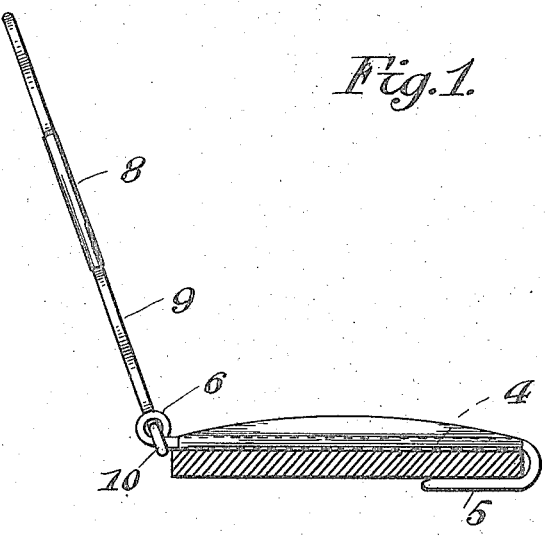
Figure 2:
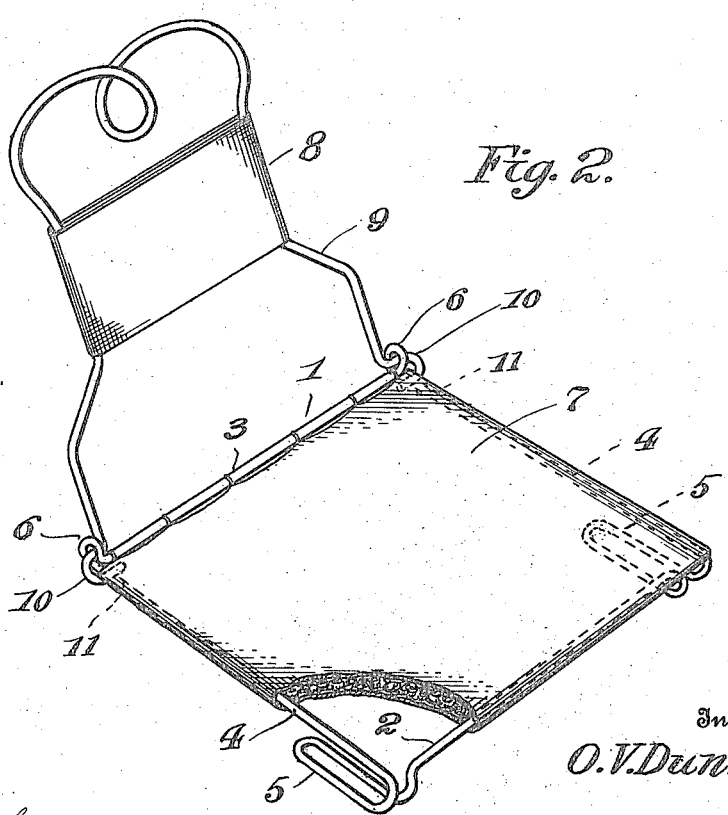

In the accompanying drawing; Figure 1 is a view in side elevation of an auxiliary seat constructed in accordance with the present invention, the same being shown as applied to a bleacher seat. Fig. 2 is a perspective view of the auxiliary seat.

Referring now to the drawing in detail, 1 designates a substantially rectangular frame which, in the present instance, is formed of a single length of wire bent to provide front and rear end bars 2 and 3 and side bars 4, 4. The front end bar 2, at its juncture with the side bars 4, is bent downwardly and rearwardly to form hooks 5 that are designed to engage beneath the forward edge of the bleacher seat, as clearly illustrated in Fig. 1 of the drawing, while the rear bar 3, at its juncture with the side bars 4, is bent to form upwardly projecting eyes 6 alining axially with each other and disposed at right angles to the rear bar. Secured to the front bar, the rear bar and the side bars in some suitable manner is a seat 7 formed of felt, canvas or any other desired material.

8 designates the back rest. In the present instance, this rest is formed of a single length of wire 9 bent upon itself between its ends and having the outer end portions thereof bent outwardly to form pintles 10 pivoted in the eyes 6, and then curved downwardly and inwardly to form stops 11 that engage beneath the side bars 4 of the frame 1 to hold the back rest in rest forming position.

In the use of the seat, the hooks 5 are engaged beneath the forward edge of the bleacher seat, thereby holding the frame 1 upon such bleacher seat, and the back rest 5 is swung upwardly to rest forming position. When the seat is occupied and the occupant leans against the back rest, the hooks 5 in engagement with the bleacher seat prevent tilting of the auxiliary seat.

I claim:

An auxiliary seat of the class described, comprising a seat frame formed of a single length of wire bent to provide front and rear end bars and side bars, the front end bar at its junction with the side bars being bent downwardly and rearwardly to form hooks, the rear bar at its junction with said side bars being bent to form upwardly projecting axially alining eyes arranged at right angles to said rear bar, and a back rest formed of a single length of wire having the end portion thereof bent to provide pintles pivoted in the said eyes, respectively.

In testimony whereof I affix my signature in presence of two witnesses.

OLIN V. DUNN.

Witnesses:
VAN D. FISHBACK,
IVAN L. COBEL.